US 8,449,196 B2

(12) United States Patent
Bretez et al.

(10) Patent No.: US 8,449,196 B2
(45) Date of Patent: May 28, 2013

(54) FLUID-TIGHT ROTATION-GUIDING DEVICE

(75) Inventors: Arnaud Bretez, Ville (FR); Eric Collard, Buc (FR); Michel Rousset, Guyancourt (FR)

(73) Assignee: Thales, Neuilly-sur-Siene (FR)

( * ) Notice: Subject to any disclaimer, the term of this patent is extended or adjusted under 35 U.S.C. 154(b) by 321 days.

(21) Appl. No.: 12/744,928

(22) PCT Filed: Nov. 25, 2008

(86) PCT No.: PCT/EP2008/066160
§ 371 (c)(1),
(2), (4) Date: Jun. 4, 2010

(87) PCT Pub. No.: WO2009/068532
PCT Pub. Date: Jun. 4, 2009

(65) Prior Publication Data
US 2010/0303396 A1    Dec. 2, 2010

(30) Foreign Application Priority Data
Nov. 27, 2007    (FR) .................................... 07 08290

(51) Int. Cl.
   *F16C 33/76*    (2006.01)
   *F16C 33/78*    (2006.01)
(52) U.S. Cl.
   CPC .................................. *F16C 33/7816* (2013.01)
   USPC ........................................................ 384/477

(58) Field of Classification Search
USPC .. 384/477, 480, 481, 484, 487, 489; 277/353, 277/357, 373, 379, 551, 572–577
See application file for complete search history.

(56) References Cited

U.S. PATENT DOCUMENTS

| | | | |
|---|---|---|---|
| 2,516,191 A | | 7/1950 | Englesson |
| 2,951,719 A | * | 9/1960 | Porges .......................... 277/396 |
| 3,301,568 A | | 1/1967 | Perry |
| 5,364,111 A | * | 11/1994 | Wunsch ........................ 277/557 |
| 2005/0158166 A1 | | 7/2005 | Dean |

FOREIGN PATENT DOCUMENTS

| | | |
|---|---|---|
| FR | 916295 A | 12/1946 |
| FR | 2398237 A1 | 2/1979 |
| GB | 642585 A | 9/1950 |

* cited by examiner

*Primary Examiner* — James Pilkington
*Assistant Examiner* — Richard Urbanski
(74) *Attorney, Agent, or Firm* — Baker & Hostetler LLP

(57) ABSTRACT

A rotation-guiding device includes a fixed support and a movable support able to rotate around the fixed support about an axis of rotation, wherein an interface between the fixed and movable supports includes a bearing to guide the movable support in rotation about the fixed support, a flexible dynamic seal providing seal-tightness between the fixed support and the movable support that is mounted between a friction track secured to one of said supports and a mechanical structure secured to the other support, and which includes a metal spring to provide the contact force for the seal between the friction track and the mechanical structure. The dynamic seal may be mounted parallel to the axis of rotation so that the contact force is exerted parallel to the axis of rotation.

6 Claims, 5 Drawing Sheets

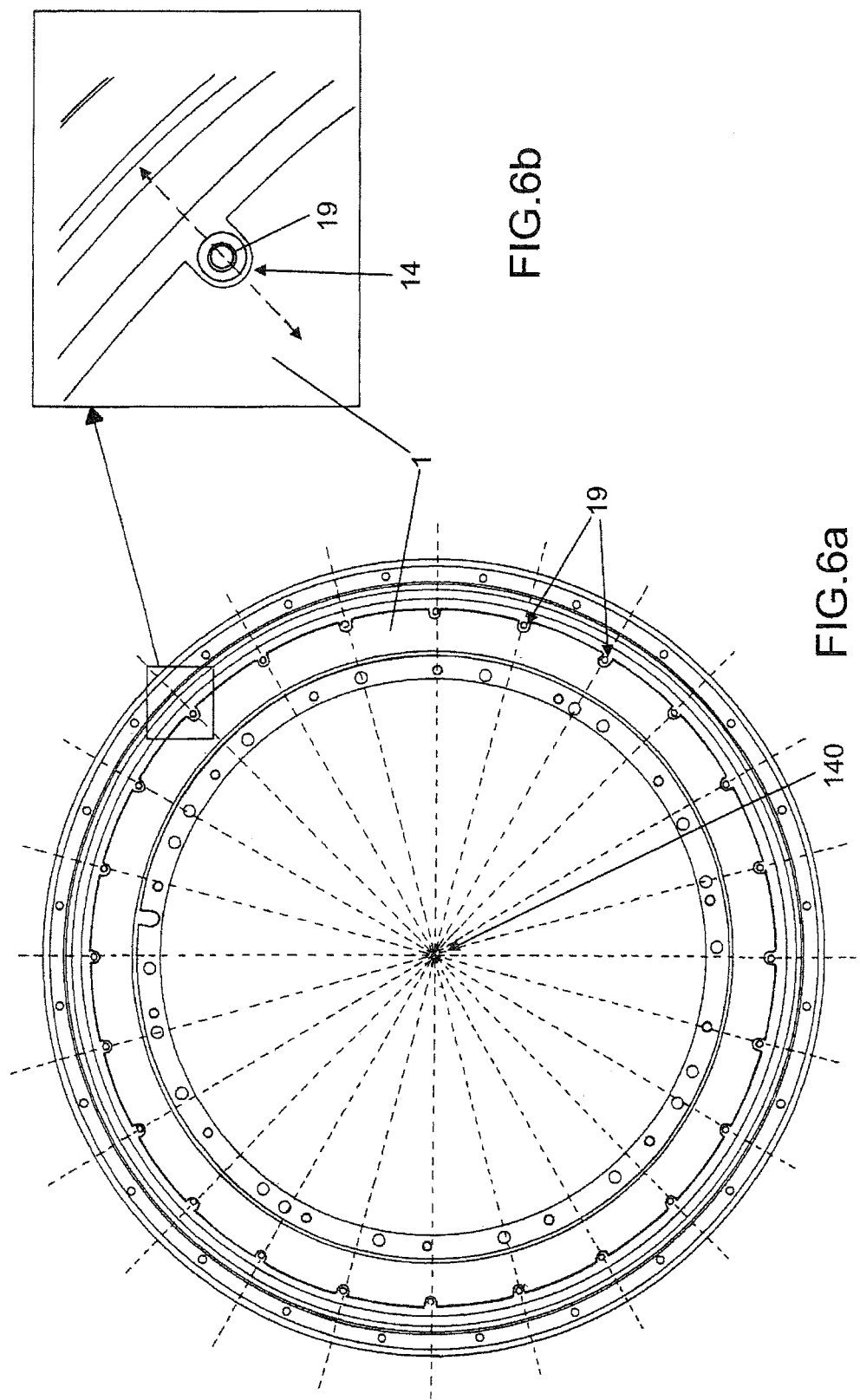

FLUID-TIGHT ROTATION-GUIDING DEVICE

CROSS-REFERENCE TO RELATED APPLICATIONS

This application is a National Stage of International patent application PCT/EP2008/066160, filed on Nov. 25, 2008, which claims priority to foreign French patent application No. FR 07 08290, filed on Nov. 27, 2007, the disclosures of which are hereby incorporated by reference in their entirety.

FIELD OF THE INVENTION

The field of the invention is that of rotation-guiding devices, intended for mounting between the fixed and movable parts of an equipment item subject to strong thermal and pressure variations. The movable part is guided in its rotation on the fixed part. The invention relates more particularly to the rotation-guiding devices that are used to provide the seal-tightness for the equipment item with regard to solid particles and/or fluids coming from outside.

BACKGROUND OF THE INVENTION

This equipment item is, for example, an airborne nacelle 100, diagrammatically represented in cross section in FIG. 1. This nacelle comprises a fixed element 110 and a movable element 120 rotating about an axis of rotation 140. The figure also shows two fluid-tight rotation-guiding devices 130a, 130b in a ring configuration which guide the movable element 120 of the nacelle in its rotation about the axis of rotation 140. A portion of one of these rotation-guiding devices is shown in close-up.

There are currently various types of rotation-guiding devices.

Rotation-guiding devices with a dynamic seal, an example of which is shown in FIG. 2, can be cited as an indication. These devices comprise:

a supporting structure comprising a fixed support 11 secured to the fixed element 110 of the equipment item and a movable support 12 secured to the movable element 120 of the equipment item and capable of rotating around the fixed support about an axis of rotation 140, an interface between the fixed 11 and movable 12 supports which comprises a flexible dynamic seal 1 secured to the fixed support 11 (or the movable support 12), which provides the dynamic seal between these fixed and movable supports. An example of a tight dynamic seal is shown in FIG. 3. It notably comprises:

a bearing face 2 intended to bear on the fixed support 11, a friction face 3 parallel to the bearing face, intended for the dynamic contact with a friction track 4 linked to the movable support, this friction face usually being less wide than the bearing face, and a metal spring 5 placed between the bearing face 2, the friction face 3 and an intermediate face 6 joining the bearing face and the friction face, and the function of which is to separate these two faces to ensure that the friction face 3 is brought into contact with the friction track 4 according to a contact force perpendicular to the friction face. This contact force can also be obtained without a spring, by deformation of the dynamic seal.

Referring now to FIG. 2, the interface also comprises a revolving bearing 135 which guides the movable support 11 in its rotation around the fixed support 12 and which comprises a row of balls 13 housed between two raceways formed in an inner ring 131 and an outer ring 132 respectively fixed to the fixed 11 and movable 12 supports of the rotation-guiding device.

In the context, for example, of the design of an airborne nacelle, it is necessary to produce equipment with a reduced bulk and weight, capable of withstanding severe vibratory environments, impacts and pressure and temperature variations, without performance levels being degraded or altered. In the case of an airborne nacelle, the pressure variations between the interior and the exterior of the nacelle can reach 1 bar and the temperature variations are between $-55°$ C. and $80°$ C. The current seals conventionally made of elastomer have an expansion coefficient such that, when subject to a drop in temperature, they shrink, leading to a reduction, or complete absence, of seal-tightness. When subject to a rise in temperature, they expand, unacceptably increasing the friction force. The performance levels of the current rotation-guiding devices with dynamic seals are inadequate in the stated pressure and temperature variation conditions: their use is limited to temperatures above $-20°$ C.

Some of the rotation-guiding devices currently used to provide better performance use a technology based on ferrofluids to provide the dynamic seal between the fixed and movable parts of the device. However, this technology is costly and exhibits high viscous friction torques at low temperature. This drawback can be compensated by a system for reheating the ferrofluid to the detriment of the cost, the bulk and the complexity of the device. An exemplary ferrofluid rotation-guiding device is represented in FIG. 4. It comprises a movable support 12, a fixed support 11, a bearing 135, a sealing element 1' formed by an oil film held in place by a magnetic field acting on conductive particles contained within the oil film.

SUMMARY OF THE INVENTION

The aim of the invention is to obtain a rotation-guiding device which offers good performance without exhibiting the abovementioned drawbacks.

More specifically, the subject of the invention is a rotation-guiding device which comprises a fixed support and a movable support which is able to rotate around the fixed support about an axis of rotation, and an interface between the fixed and movable supports, which comprises:

a bearing designed to guide the movable support in its rotation about the fixed support, a flexible dynamic seal designed to provide the seal-tightness between the fixed support and the movable support mounted between a friction track secured to one of said supports and a mechanical structure secured to the other support, which includes a metal spring intended to provide the contact force for the seal between the friction track and the mechanical structure.

It is mainly characterized in that the dynamic seal is mounted parallel to the axis of rotation, that is to say, so that the contact force is exerted parallel to the axis of rotation.

The fixed support advantageously comprises spacers and the seal comprises oblongs distributed along the seal and intended to accommodate the spacers, to provide star-guidance for the seal.

Preferably, the bearing comprises two rows of balls, and the inner and outer rings of the bearing are respectively incorporated in the fixed and movable supports.

According to one characteristic of the invention, it comprises a friction track in contact with the dynamic seal, coated with a carbon-type surface treatment in the form of amorphous diamond.

Another subject of the invention is an equipment item which comprises a fixed element, a movable element and a rotation-guiding device as described and of which the fixed support is fixed to the fixed element of the equipment item, and the movable support is fixed to the movable element of the equipment item.

This equipment item is, for example, a nacelle intended to be airborne.

BRIEF DESCRIPTION OF THE DRAWINGS

Other features and advantages of the invention will become apparent from reading the following detailed description, given as a nonlimiting example and with reference to the appended drawings in which.

From one figure to the next, the same elements are identified by the same references.

DETAILED DESCRIPTION

Figure 3:
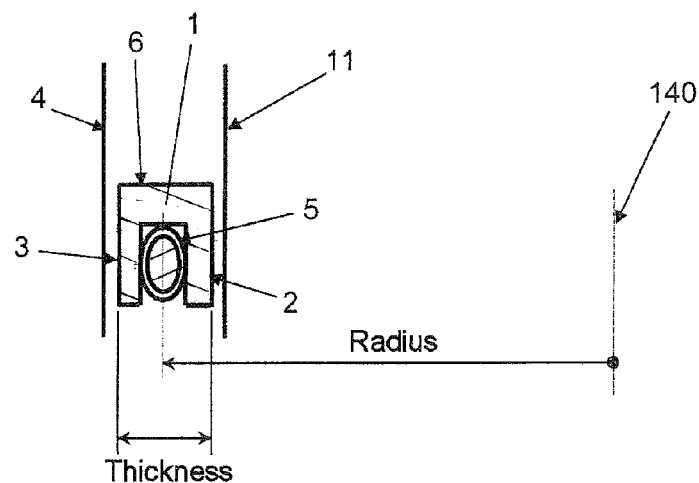
Figure 4:
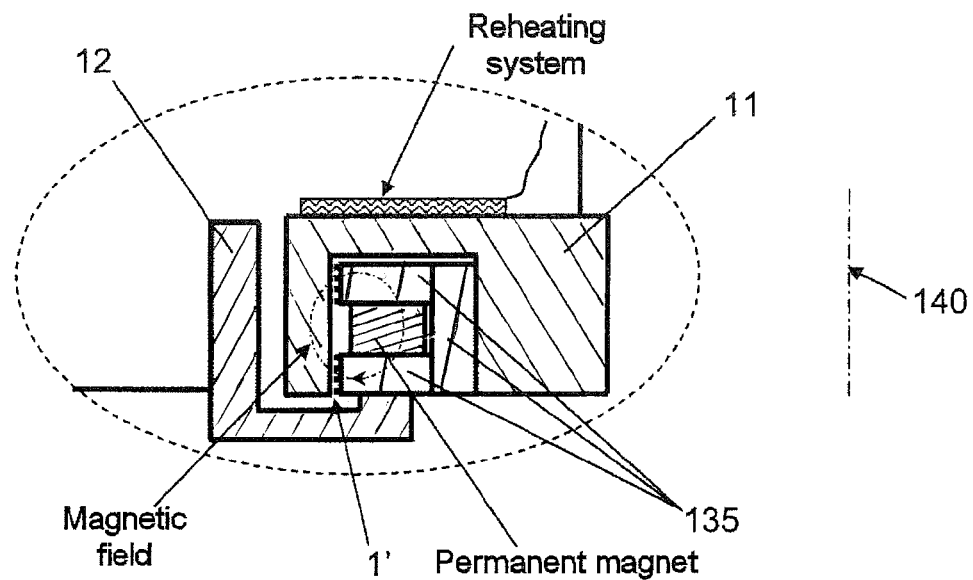
Figure 5A:
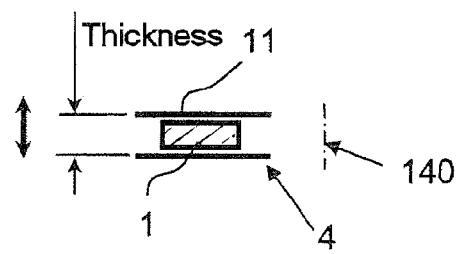
Figure 5B:
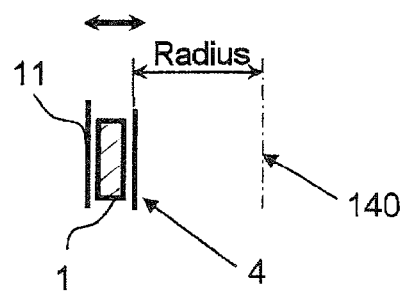

The guiding device according to the invention is noteworthy in that the dynamic seal 1 is mounted axially in the guiding device, that is to say, so that the contact force of the seal (represented by a bold double arrow) is exerted parallel to the axis of rotation 140 as illustrated by FIG. 5a. In the case of a radial mounting, the seal 1 is arranged so that the contact force of the seal (represented by a bold double arrow) is exerted perpendicularly to the axis of rotation 140 as illustrated in FIGS. 3 and 5b. Axially mounting the seal 1 is a way of overcoming its expansion problems.

In practice, in the case of an axial mounting as illustrated in FIG. 5a, the expansion is proportional to:

$\Delta T \times \text{thickness of the seal} \times \lambda_{seal}$, $\Delta T$ being the thermal variation, $\lambda_{seal}$ being the expansion coefficient of the seal expressed in m/° C. In this case, the expansion of the seal is free in the radial direction: the impact of the expansion of the seal on its preload is therefore low.

In the case of a radial mounting as illustrated in FIG. 5b, the expansion is proportional to:

$\Delta T \times \text{radius of the seal} \times \lambda_{seal}$.

In this case, the expansion of the seal is constrained in the radial direction: the impact of the expansion of the seal on its preload is therefore great.

Given that the thickness of the seal is very much less than the radius of the seal, the expansion of the seal in the direction of the contact force is considerably reduced in the axial mounting case compared to a radial mounting case. In the case of an airborne nacelle, the following dimensions are typical:

radius of the seal=75 mm thickness of the seal=7 mm.

The axial mounting thus considerably reduces the thermal effects on the seal.

Figure 1:
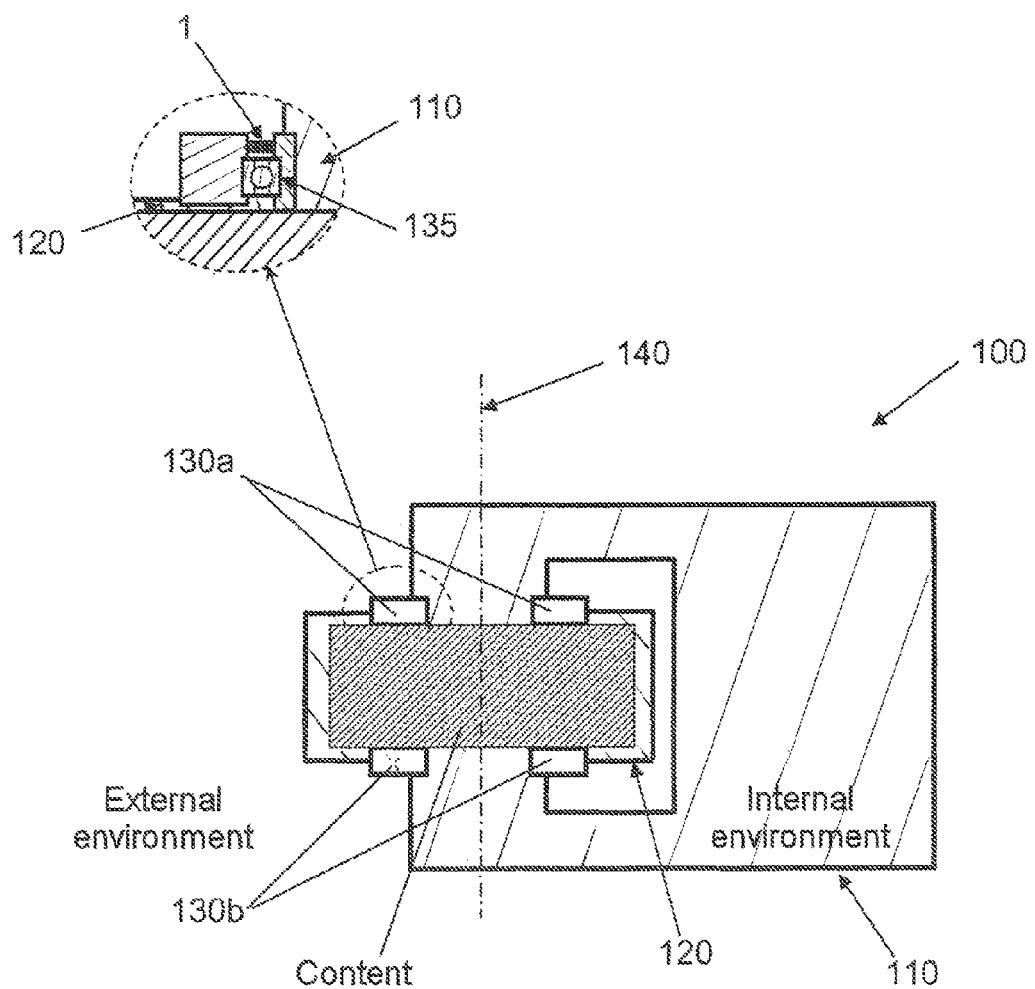
FIG. 1, already described, diagrammatically represents an airborne nacelle equipped with a rotation-guiding device, FIG. 2, already described, diagrammatically represents a rotation-guiding device according to the prior art, FIG. 3, already described, diagrammatically represents an exemplary flexible dynamic seal with metal spring, FIG. 4, already described, diagrammatically represents another rotation-guiding device according to the prior art, FIGS. 5a and 5b diagrammatically illustrate the expansion of a flexible dynamic seal in axial and radial mounting cases, FIG. 6a diagrammatically represents a plan view of a dynamic seal mounted in a guiding device according to the invention, FIG. 6b being a close-up of a portion of FIG. 6a, FIG. 7 diagrammatically represents an exemplary rotation-guiding device according to the invention.
Figure 2:
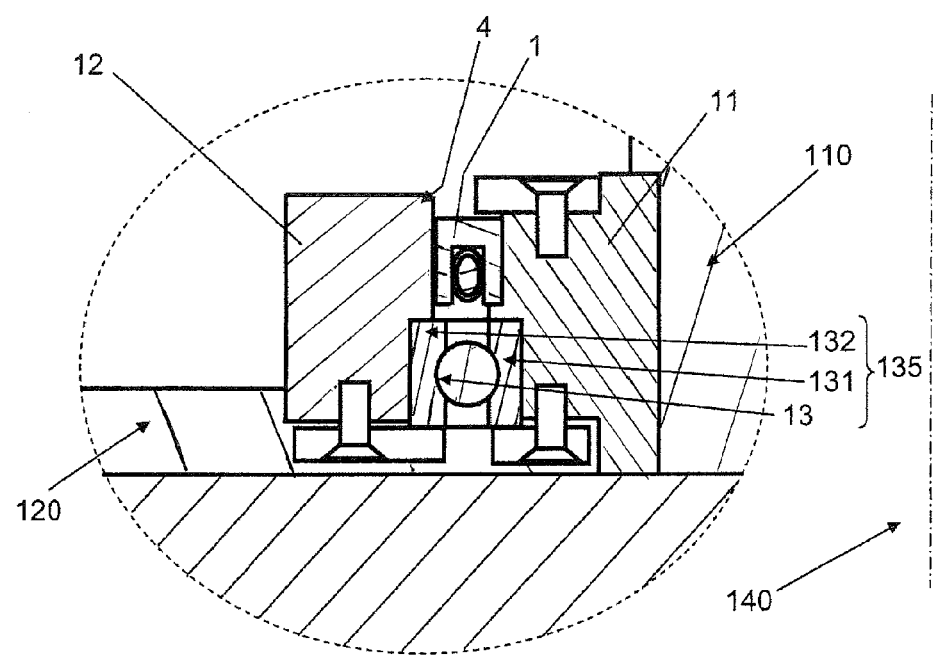

The temperature variations can also cause the seal to be misaligned. Thus, star-guiding is provided for the seal in the device according to the invention, this guiding ensuring that the seal 1 is centered regardless of the temperature. FIG. 6a shows a plan view of a dynamic seal 1 placed in a rotation-guiding device: this is a view along the axis of rotation 140 in FIG. 1 of the guiding device described. The star-guidance, represented by axis lines, is obtained by means of spacers 19 evenly distributed on the fixed support 11 of the guiding device, in contact with the bearing face of the seal 1; these spacers 19 engage in oblongs 14 provided for this purpose in the bearing face of the seal 1. The oblongs 14 are preferentially arranged on the outer periphery of the seal 1 as indicated in FIG. 6b. According to another embodiment, they form holes or recesses inside the seal. The spacers are advantageously identical, as are the oblongs. There are, for example, 24 spacers and as many oblongs for a seal with a radius of approximately 75 mm. The spacers are, for example, 5 mm in diameter.

Figure 7:
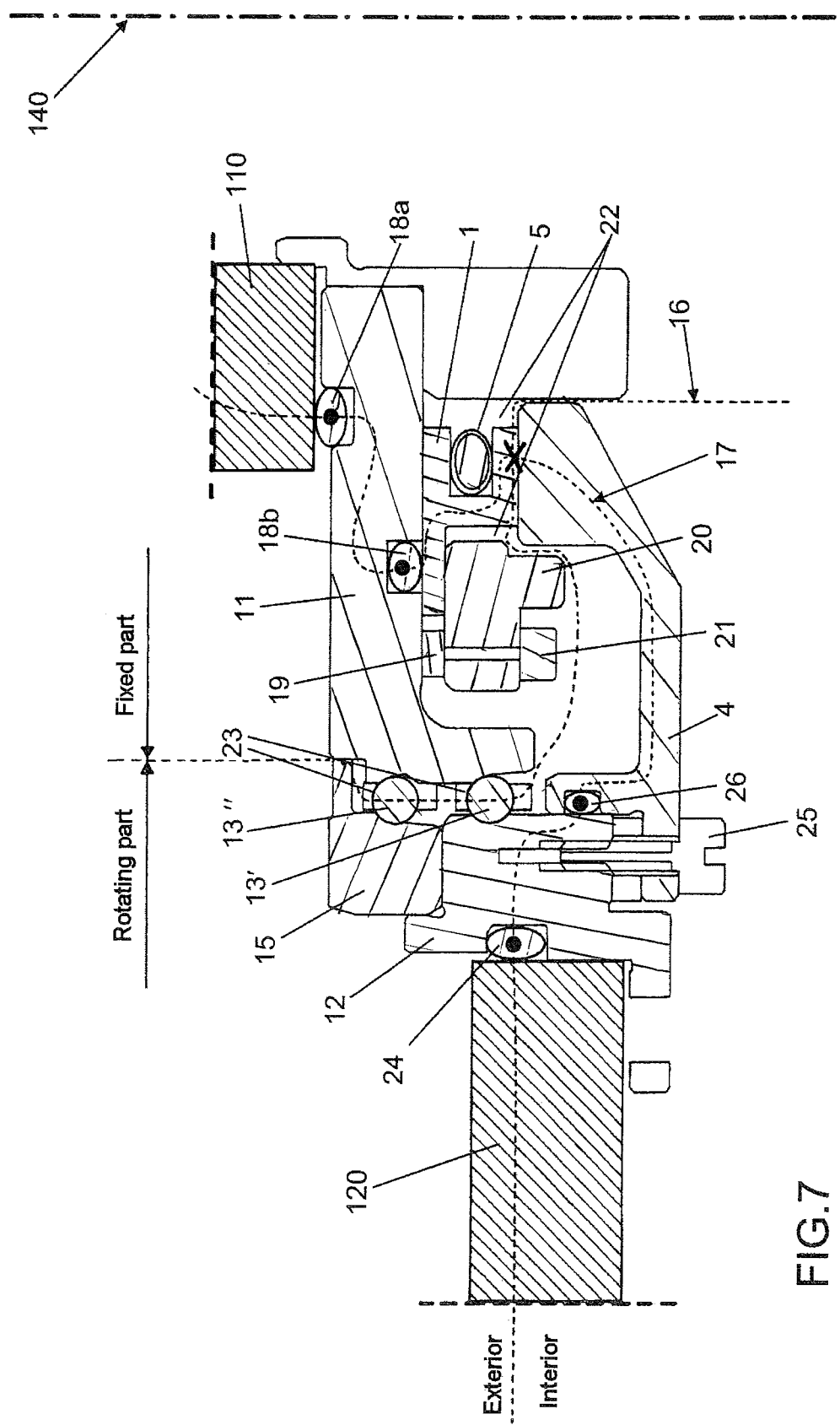

The operating quality of the guiding device also relies on the production quality of the mechanics. Repeated use in the conditions indicated leads to a warping of the bearing 135, a reduction in its stiffness and a lack of rotation-guiding accuracy. Another noteworthy element of the device according to the invention which makes it possible to reduce this problem consists in incorporating the rings of the bearing in the guiding device as illustrated in FIG. 7. The inner ring of the bearing is incorporated in the fixed support 11 of the guiding device. The outer ring generally comprises two parts that make it possible to adjust the bearing on mounting; one of these parts is incorporated in the movable support 12. According to a variant embodiment, the outer ring is in a single part incorporated in the movable support and the inner ring is in two parts, one of which is incorporated in the fixed support. This integration reduces the number of parts and therefore of interfaces likely to introduce a warping of the bearing in its operation. Furthermore, the bearing comprises two rows of balls 13', 13" of the same diameter, which make it possible to obtain a small variation of the friction torque of the bearing and thus improve rotation-guiding accuracy; two internal raceways are then formed in the fixed support 11 and an external raceway is formed in the movable support 12, the second external raceway being formed in the part 15 of the outer ring that is not incorporated in the movable support 12. According to the variant considered above, two external raceways are then formed in the movable support and an internal raceway is formed in the fixed support, the second internal raceway being formed in the part of the inner ring that is not incorporated in the fixed support. This integration also makes it possible to provide the seal with a stable base despite repeated use and to optimize the quality of the friction surface with the dynamic seal.

Finally, the friction track 4 linked to the movable support 12, and which is in contact with the seal 1, is advantageously coated with a surface treatment which improves the quality of the friction surface, notably by delaying its wear. One example of surface treatment that can be used is of carbon type in the form of amorphous diamond, also called "DLC", an acronym for "Diamond-like carbon".

An exemplary rotation-guiding device according to the invention is described in relation to FIG. 7, the rotation-guiding device being installed between the fixed 110 and movable 120 elements of an equipment item. The figure shows two lines of separation. One 16 represents the separation between the fixed and movable parts of the guiding device; the other 17 represents the seal-tight barrier, on the path of which are located the dynamic seal 1 which provides the dynamic seal-tightness and static seals 18a, 18b, 26, 24 which provide a static seal-tightness between mechanical elements attached to one another.

The fixed part of the guiding device comprises:

A fixed support 11 fixed to the fixed element 110 of the equipment item, and linked to the dynamic seal 1. This fixed support 11 is machined so as to form the two internal raceways of the bearing. These raceways are typically separated from one another by approximately 6 mm. The balls 13', 13" housed in these raceways are, for example, 4 mm in diameter. Two static seals are housed in the fixed support 11, one 18a being in contact with the fixed element 110 of the equipment item, the other 18b with the bearing face of the dynamic seal 1. The spacers 19 which engage in the oblongs of the bearing face of the seal are arranged on this fixed support 11.

The dynamic seal 1 which provides seal-tightness at its friction face. The dynamic seal 1 is fixed to the fixed support 11 by a flange 20 for fixing the seal which is partially applied to the free part of the bearing face, that is to say, the part that is not in contact with the spring 5. This flange 20 is fixed by means of a screw 21 which is engaged as far as the fixed support 11 through an oblong and a spacer 19. To allow for the expansion of the seal, a play 22 is provided between the seal (outside the bearing and friction faces) and the mechanical parts.

The movable part of the bearing comprises:

A movable support 12 fixed to the movable element 120 of the equipment item. This movable support 12 is machined so as to form one of the two external raceways of the bearing to house a first row of balls 13'. Ball separators 23 are preferentially installed in the raceways. A static seal 24 in contact with the movable element 120 of the equipment item is housed in this movable support 12.

The other part 15 of the outer ring machined so as to form the other external raceway of the bearing and fitted to the movable support 12 to house the second row of balls 13".

A friction track 4 is fixed to this movable support 12 by means, for example, of a screw 25. A static seal 26 in contact with the movable support 12 is housed in this friction track 4; this friction track 4 is, moreover, in contact with the friction face of the dynamic seal 1.

The invention claimed is:

1. A rotation-guiding device which comprises a fixed support and a movable support which is able to rotate around the fixed support about an axis of rotation, and an interface between the fixed support and the movable support, the interface comprising:
    a bearing designed to guide the movable support in its rotation about the fixed support,
    a flexible dynamic seal designed to provide a seal-tightness between the fixed support and the movable support, the dynamic seal having a friction face and being mounted between a friction track secured to one of said supports and a mechanical structure secured to the other support, and which includes a metal spring creating a contact force between the friction face and the friction track to provide said seal-tightness between the friction track and the mechanical structure,
    wherein the dynamic seal is mounted parallel to the axis of rotation so that the contact force is exerted parallel to the axis of rotation, and wherein the fixed support comprises spacers and the dynamic seal further comprises oblongs distributed along the dynamic seal to accommodate the spacers.

2. The rotation-guiding device as claimed in claim 1, wherein the bearing further comprises an inner ring secured to the fixed support and an outer ring secured to the movable support, and balls housed between the inner ring and the outer ring.

3. The rotation-guiding device as claimed in claim 2, wherein the bearing further comprises two rows of balls, and the inner ring and the outer ring of the bearing are respectively incorporated in the fixed support and the movable support.

4. The rotation-guiding device as claimed in claim 1, wherein the friction track in contact with the dynamic seal is coated with a carbon-type surface treatment in the form of amorphous diamond.

5. An equipment item which comprises a fixed element, a movable element and a rotation-guiding device as claimed in claim 1 and of which the fixed support is fixed to the fixed element of the equipment item, and the movable support is fixed to the movable element of the equipment item.

6. The equipment item as claimed in claim 5, wherein the equipment item is a nacelle intended to be airborne.

\* \* \* \* \*